US011073446B2

(12) United States Patent
Wakasugi

(10) Patent No.: US 11,073,446 B2
(45) Date of Patent: Jul. 27, 2021

(54) WEAR INSPECTION APPARATUS AND WEAR INSPECTION METHOD

(71) Applicant: MITSUBISHI HEAVY INDUSTRIES ENGINEERING, LTD., Yokohama (JP)

(72) Inventor: Kazuyuki Wakasugi, Tokyo (JP)

(73) Assignee: MITSUBISHI HEAVY INDUSTRIES ENGINEERING, LTD., Yokohama (JP)

( * ) Notice: Subject to any disclaimer, the term of this patent is extended or adjusted under 35 U.S.C. 154(b) by 277 days.

(21) Appl. No.: 16/090,466

(22) PCT Filed: Mar. 15, 2017

(86) PCT No.: PCT/JP2017/010443
§ 371 (c)(1),
(2) Date: Oct. 1, 2018

(87) PCT Pub. No.: WO2017/175555
PCT Pub. Date: Oct. 12, 2017

(65) Prior Publication Data
US 2019/0120722 A1    Apr. 25, 2019

(30) Foreign Application Priority Data

Apr. 7, 2016    (JP) .............................. JP2016-077263

(51) Int. Cl.
*G01M 17/02*    (2006.01)
*G01B 11/24*    (2006.01)
(Continued)

(52) U.S. Cl.
CPC ........... *G01M 17/027* (2013.01); *B60C 19/00* (2013.01); *B60L 5/38* (2013.01); *F16D 66/02* (2013.01);
(Continued)

(58) Field of Classification Search
CPC ..... G01M 17/027; G01M 17/02; B60C 19/00; B60L 5/38; F16D 66/02; F16D 2066/006; G01B 11/24; G01B 21/00; G01B 21/045
(Continued)

(56) References Cited

U.S. PATENT DOCUMENTS 5,249,460 A * 10/1993 Dory ................... G01M 17/027
73/146
2007/0295071 A1    12/2007 Iwase et al.
(Continued)

FOREIGN PATENT DOCUMENTS

JP    2007-263692 A    10/2007
JP    2008-003044 A    1/2008
(Continued)

OTHER PUBLICATIONS

PCT/ISA/210, "International Search Report for International Application No. PCT/JP2017/010443," dated Jun. 13, 2017.
(Continued)

*Primary Examiner* — Leslie J Evanisko
(74) *Attorney, Agent, or Firm* — Kanesaka Berner and Partners LLP

(57) ABSTRACT

A wear inspection apparatus includes a data acquisition unit which is configured to acquire surface shape data including information indicating a shape of a surface of a part wearing as a vehicle travels, and an approximation processing unit which is configured to calculate an approximation line for the acquired surface shape data and calculates a degree of wear of the part from the approximation line and a worn portion included in the surface shape data.

9 Claims, 15 Drawing Sheets

(51) Int. Cl.
*G01B 21/00* (2006.01)
*G01B 21/04* (2006.01)
*B60C 19/00* (2006.01)
*F16D 66/02* (2006.01)
*B60L 5/38* (2006.01)
*F16D 66/00* (2006.01)

(52) U.S. Cl.
CPC .............. *G01B 11/24* (2013.01); *G01B 21/00* (2013.01); *G01B 21/045* (2013.01); *G01M 17/02* (2013.01); *F16D 2066/006* (2013.01)

(58) Field of Classification Search
USPC .................................. 703/34; 73/146; 702/34
See application file for complete search history.

(56) References Cited

U.S. PATENT DOCUMENTS

| | | | | |
|---|---|---|---|---|
| 2011/0246128 A1* | 10/2011 | Nicholson | ............ | G01M 17/02 702/145 |
| 2016/0033368 A1* | 2/2016 | Neau | ..................... | B60C 11/246 702/34 |
| 2016/0121671 A1* | 5/2016 | Neau | ..................... | B60C 99/006 703/6 |
| 2016/0343126 A1* | 11/2016 | Miller | .................... | G01B 11/22 |

FOREIGN PATENT DOCUMENTS

| | | |
|---|---|---|
| JP | 4567533 B2 | 10/2010 |
| JP | 5303405 B2 | 10/2013 |
| WO | 2015/016888 A1 | 2/2015 |

OTHER PUBLICATIONS

PCT/ISA/237, "Written Opinion of the International Searching Authority for International Application No. PCT/JP2017/010443," dated Jun. 13, 2017.

\* cited by examiner

WEAR INSPECTION APPARATUS AND WEAR INSPECTION METHOD

TECHNICAL FIELD

The present invention relates to a wear inspection apparatus and a wear inspection method.

Priority is claimed on Japanese Patent Application No. 2016-077263, filed Apr. 7, 2016, the content of which is incorporated herein by reference.

BACKGROUND ART

In railroads, new traffic systems, and the like, parts such as tires and pantograph shoes used in vehicles wear as the vehicles travels. For this reason, it is necessary to measure the amount of wear on a daily basis and to perform operations such as replacement with new parts when the amount of wear exceeds a fixed value. The measurement of the amount of wear is generally performed manually using calipers or the like in many cases.

Patent Document 1 discloses a method of imaging a tire of a vehicle and determining wear damage through image processing. Patent Document 1 discloses that it is possible to ascertain deterioration conditions of the tire by detecting a feature point through image processing and comparing the feature point with a feature point of the same tire imaged previously according to the method disclosed in Patent Document 1.

CITATION LIST

Patent Literature

[Patent Document 1]
  Japanese Patent No. 5303405

SUMMARY OF INVENTION

Technical Problem

However, manual methods require time and effort, labor costs, and the like, and there is a problem that data obtained tends to be limited to only a portion (for example, a maximum value) of actually generated wear. Even when the method of Patent Document 1 is used, deterioration conditions can be ascertained only for a portion of the tire.

The present invention provides a wear inspection apparatus and a wear inspection method which are capable of solving the above-described problem.

Solution to Problem

According to a first aspect of the present invention, a wear inspection apparatus includes a data acquisition unit which is configured to acquire surface shape data including information indicating a shape of a surface of a part wearing as a vehicle travels, and an approximation processing unit which is configured to calculate an approximation line for the acquired surface shape data and calculates a degree of wear of the part from the approximation line and a worn portion included in the surface shape data.

According to a second aspect of the present invention, the wear inspection apparatus may further include a processing target extraction unit which is configured to distinguish between a gradient portion in which a difference between a value of each point included in the surface shape data and a value of an adjacent point is larger than a predetermined threshold value, and a flat portion in which the difference is smaller than the predetermined threshold value in the surface shape data, and extract a processing target section for calculating a degree of wear in the surface shape data from the gradient portion and the flat portion after the distinguishment.

According to a third aspect of the present invention, the wear inspection apparatus may further include a noise elimination unit which is configured to eliminate noise from the surface shape data, and the noise elimination unit is configured to perform coordinate conversion so that the pieces of surface shape data measured by a sensor in respective positional relationships are converted into pieces of surface shape data measured in the same positional relationship, in accordance with changes in a relative positional relationship between the part and the sensor measuring the shape of the surface of the part.

According to a fourth aspect of the present invention, the processing target extraction unit may create a histogram according to each value included in the surface shape data and a frequency of appearance of the value, the processing target extraction unit may adjust a classification width of the histogram on the basis of a predetermined number of groups in a case where values corresponding to a surface portion or a groove portion which are selected from among the values included in the surface shape data are classified into the number of groups, and may create a histogram in which the pieces of surface shape data are classified into the number of groups, and the processing target extraction unit may extract a portion of surface shape data corresponding to the flat portion and a portion of surface shape data corresponding to a groove portion formed in the surface of the part from the created histogram.

According to a fifth aspect of the present invention, the approximation processing unit may calculate a depth of the groove portion on the basis of a difference between the surface shape data corresponding to the groove portion which is extracted by the processing target extraction unit and the calculated approximation line.

According to a sixth aspect of the present invention, the processing target extraction unit may extract the largest flat portion as a processing target section from the flat portion distinguished with the gradient portion as a boundary, out of the flat portion and the gradient portion after the distinguishment.

According to a seventh aspect of the present invention, the approximation processing unit may calculate an approximation straight line on the basis of surface shape data corresponding to the flat portion extracted by the processing target extraction unit, and may calculate the amount of wear of the part by integrating a difference between a value of the approximation straight line and a value of the surface shape data with respect to a section in which wear occurs in the surface shape data, the approximation straight line being approximate to a sequence of points of an unworn portion of the part in the surface shape data.

According to an eighth aspect of the present invention, the wear inspection apparatus may further include an evaluation model creation unit which is configured to create an evaluation model for evaluating the degree of wear of the part according to operation conditions of the vehicle on the basis of the degree of wear of the part which is calculated by the approximation processing unit and operation data indicating the operation conditions of the vehicle including the part, and a replacement time prediction unit which is configured to acquire operation data on a target vehicle serving as an evaluation target, evaluate the degree of wear occurring in a part of the target vehicle on the basis of the operation data and the evaluation model, and predict a time for replacement of the part of the target vehicle for which the degree of wear is evaluated, on the basis of information indicating the time for replacement of the part which is determined in association with the degree of wear of the part of the target vehicle.

According to a ninth aspect of the present invention, there is provided a wear inspection method including acquiring surface shape data including information indicating a shape of a surface of a part wearing as a vehicle travels, and calculating an approximation line for the acquired surface shape data and calculating a degree of wear of the part from the approximation line and a worn portion included in the surface shape data.

Advantageous Effects of Invention

According to the above-described wear inspection apparatus and wear inspection method, it is possible to measure not only limited information such as only a maximum value of a worn portion of a part but also the overall wear conditions of the part and the amount of wear in any worn portion.

DESCRIPTION OF EMBODIMENTS

First Embodiment

Hereinafter, a wear inspection apparatus in a first embodiment will be described with reference to FIGS. 1 to 18.

Figure 1:
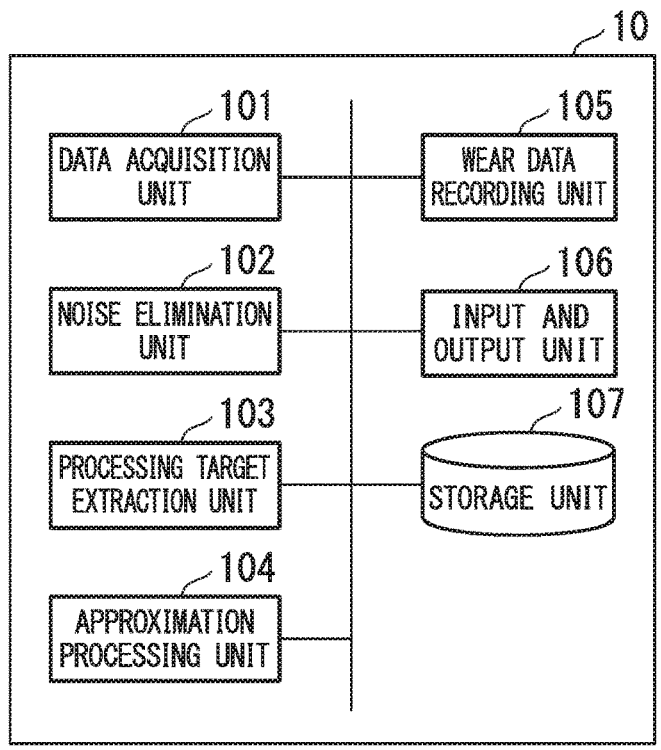
FIG. 1 is a block diagram showing a configuration example of a wear inspection apparatus in a first embodiment according to the present invention.

FIG. 1 is a block diagram showing a configuration example of the wear inspection apparatus in the first embodiment according to the present invention. A wear inspection apparatus 10 shown in FIG. 1 is constituted by a computer such as a server apparatus. Units 102 to 107 included in the wear inspection apparatus 10 shown in FIG. 1 are configured by executing one or a plurality of programs using a Central Processing Unit (CPU), a storage apparatus, an input and output apparatus, a communication apparatus, and the like included in the computer constituting the wear inspection apparatus 10.

As shown in the drawing, the wear inspection apparatus 10 includes a data acquisition unit 101, a noise elimination unit 102, a processing target extraction unit 103, an approximation processing unit 104, a wear data recording unit 105, an input and output unit 106, and a storage unit 107.

The data acquisition unit 101 acquires surface shape data indicating the shape of the surface of a part wearing as a vehicle travels. The surface shape data is a distance image according to a distance between a sensor and a part that is measured by, for example, a distance image sensor. The worn part is, for example, a tire, a pantograph shoe, an electric-car line, or the like. Next, an example of a part which wears is shown in FIG. 2.

Figure 2:
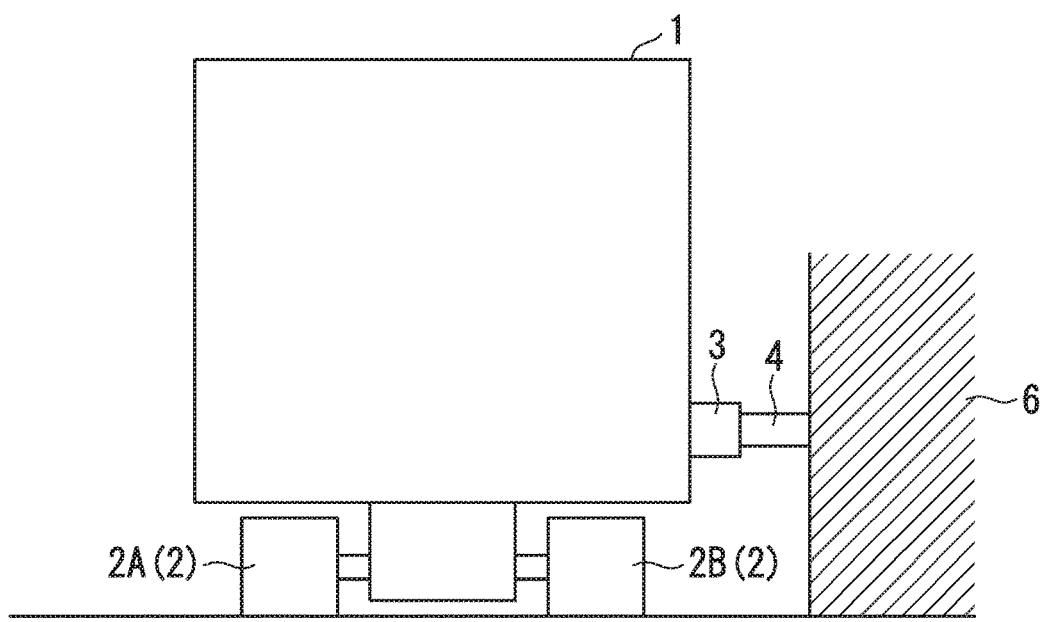
FIG. 2 is a diagram showing an example of a contour of a vehicle seen from the front in the first embodiment according to the present invention.

FIG. 2 is a diagram showing an example of a contour of a vehicle seen from the front in the first embodiment according to the present invention.

In a vehicle 1, tires 2 (2A, 2B) for traveling are respectively provided on the right and left sides of a vehicle body. The tires 2 are in contact with the road surface, and the vehicle 1 travels by the tires rotating while being in contact with the road surface. The tire 2 wears due to the contact with the road surface during traveling. A pantograph shoe 3 connected to a power feeding apparatus and receiving power from an electric-car line 4 fixed to a side wall 6 is provided on the side surface of the vehicle body. The vehicle 1 receives power from the power feeding apparatus by bringing the pantograph shoe 3 into contact with the electric-car line 4. The pantograph shoe 3 is in contact with the electric-car line 4 also while the vehicle 1 travels. Due to this contact, the pantograph shoe 3 wears as the vehicle 1 travels. Similarly, the electric-car line 4 wears by coming into contact with the pantograph shoe 3 as the vehicle 1 travels.

Next, the measurement of a surface shape which is performed by the distance image sensor will be described with reference to FIG. 3 by taking the case of the tire 2 as an example.

Figure 3:
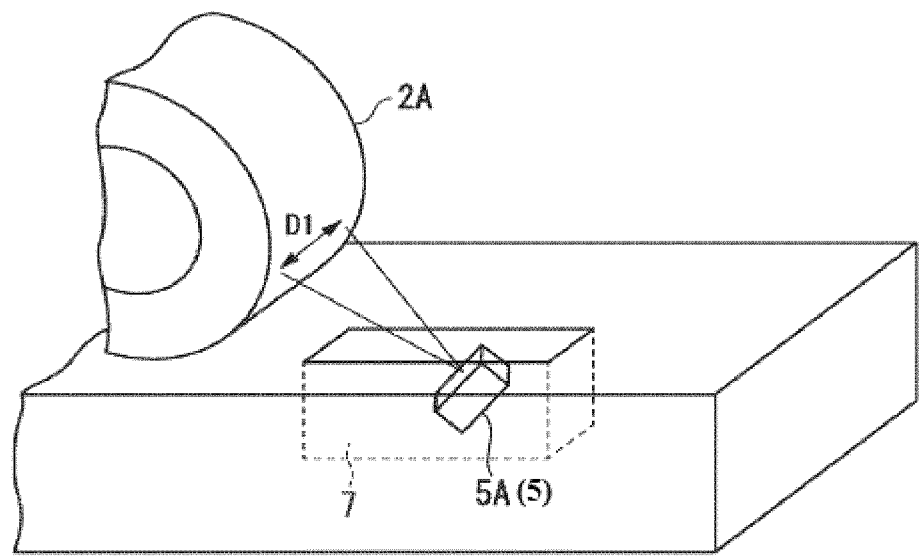
FIG. 3 is a diagram showing an example of measurement of a tire surface that is performed by an image sensor in the first embodiment according to the present invention.

FIG. 3 is a diagram showing an example of measurement of a tire surface which is performed by an image sensor in the first embodiment according to the present invention.

For example, as shown in FIG. 3, a hole 7 is provided at a position where the tire 2 travels on a road surface of a vehicle base where the vehicle 1 parks at night, and an image sensor 5A is provided in the hole 7. The image sensor 5A emits a laser beam having a width D1 in the tire 2A, and measures a distance from the image sensor 5A to each part. The image sensor 5A measures a distance from the image sensor 5A to each part in the form of a line in the width direction of the tire 2A. For example, the width of the tire 2A is approximately 300 millimeters (mm), while the width of the hole 7 is approximately 50 millimeters. For example, in a case of the position on the tire 2A where an irradiation distance of a laser beam is approximately 450 millimeters, the image sensor 5A measures a distance to each part with respect to the width D1 of approximately 250 millimeters. The image sensor 5A outputs a distance image showing irregularities on the surface of an object on the basis of the measured distance. It is possible to detect irregularities on the surface of the tire 2A by obtaining the amount of change (a difference from a neighbor) in the tire 2A in the width direction with respect to the distance image output by the image sensor 5A. Thereby, the wear inspection apparatus 10 calculates the depth of a groove provided in the surface of the tire 2A. The image sensor 5A irradiates the tire 2A with a laser, for example, when the vehicle 1 slowly enters the vehicle base for parking, measures a distance to each part of the tire 2A, and outputs a distance image showing irregularities on the surface. In this case, the image sensor 5A outputs, for example, a distance image over the whole circumference of the tire 2A.

As shown in FIG. 3, the image sensor 5A is provided at a position below the road surface, and is installed so as to measure a distance to the tire 2A positioned above and having an inclination in the traveling direction of the vehicle with respect to the vertical direction. In this manner, the image sensor 5A measures a distance to the tire 2A positioned in a direction having an inclination in the traveling direction of the vehicle with respect to the vertical direction therefrom, so that the measurement can be performed in a state where the tire 2A is not in contact with the ground, that is, a state where the tire 2A is not crushed by its weight. Thereby, the wear inspection apparatus 10 can calculate the depth of the groove of the tire 2A more accurately than when calculating the depth in a state where the tire 2A is crushed by its weight.

Although not shown in the drawing, similarly, regarding a case of the tire 2B, the distance image sensor is installed in a hole provided in a road surface, and a distance image showing the shape of the surface of the tire 2B is output.

Next, the measurement of a surface shape which is performed by the distance image sensor will be described with reference to FIG. 4 by taking the case of the pantograph shoe 3 as an example.

Figure 4:
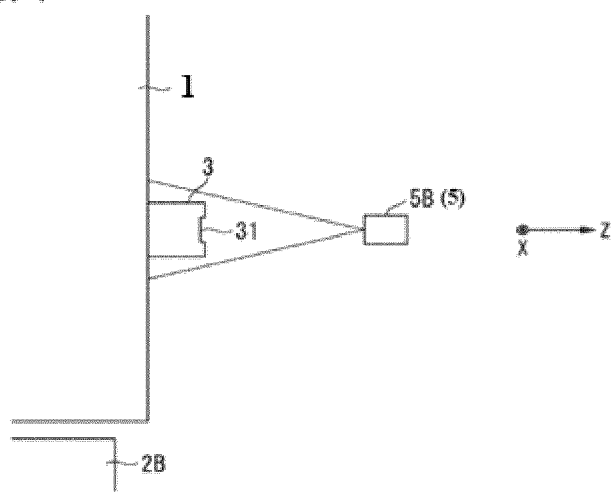
FIG. 4 is a diagram showing an example of measurement of a pantograph shoe surface that is performed by an image sensor in the first embodiment according to the present invention.

FIG. 4 is a diagram showing an example of measurement of the surface of a pantograph shoe which is performed by an image sensor in the first embodiment according to the present invention.

As shown in FIG. 4, an image sensor 5B is provided at a height including the pantograph shoe 3 within a visual field range toward the side surface of the vehicle body with respect to the traveling direction of the vehicle 1, for example, within the vehicle base. A concave portion 31 generated by wear occurring due to contact with the electric-car line 4 is formed in the surface of the pantograph shoe. The wear inspection apparatus 10 can detect irregularities on the surface of the pantograph shoe 3 by obtaining the amount of change in the pantograph shoe 3 in the vertical direction (the amount of change in a distance between the image sensor 5B and the pantograph shoe 3 in the vertical direction) in a distance image output by the image sensor 5B. The wear inspection apparatus 10 calculates the volume of the concave portion formed in the surface of the pantograph shoe 3. The image sensor 5B irradiates the pantograph shoe 3 with a laser, for example, when the vehicle 1 slowly enters the vehicle base for parking, measures the distance to each part on the surface of the pantograph shoe 3, and outputs a distance image showing irregularities on the surface.

The vertical direction (the front-back direction of the vehicle 1) of the paper in FIG. 4 is set to be an X-axis, and the horizontal direction of the paper is set to be a Z-axis. The image sensors 5A and 5B will be collectively referred to as an image sensor 5.

Figure 5:
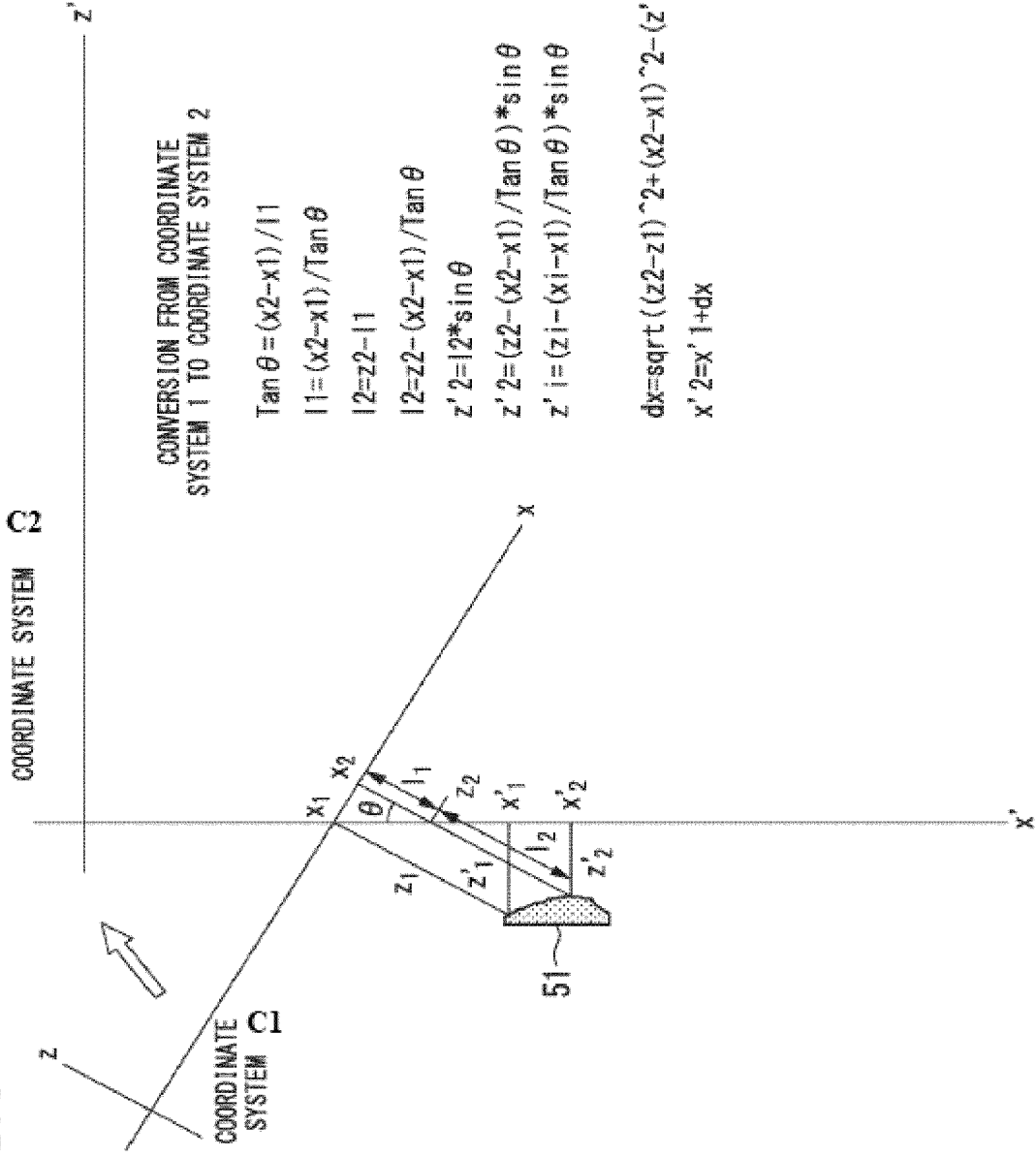
FIG. 5 is a diagram showing an example of a coordinate conversion process in the first embodiment according to the present invention.

The noise elimination unit 102 eliminates noise from a distance image. For example, a positional relationship between the image sensor 5 and an object fluctuates during measurement of the distance image. For example, in a case of the tire 2, a distance between the image sensor 5 and the tire 2 or the like changes with the movement of the vehicle 1. In a case of the pantograph shoe 3, the distance between the image sensor 5 and the pantograph shoe 3 is substantially fixed, but the pantograph shoe 3 is also moved as the vehicle 1 travels, and the position of the image sensor 5 also fluctuates over time due to the influence of vibration, or the like. Consequently, the noise elimination unit 102 performs coordinate conversion of distance images captured with the elapse of time, and performs correction so that the plurality of distance images are converted into distance images captured in the same coordinate system. This coordinate conversion can be performed using a known technique used in image processing and the like. For example, in a case of the pantograph shoe 3, a method may be used in which coordinate conversion is performed so that a reference object is superimposed with respect to any distance image, using an object regarded as not being deformed due to wear in the obtained distance image (for example, an unworn portion of the pantograph shoe 3, or a side portion of the vehicle body of the vehicle 1) as a reference. In a case of the tire 2, the noise elimination unit 102 may perform correction so that a distance image acquired when the tire 2 is far away and a distance image acquired after the vehicle 1 approaches are converted into distance images measured at positions where a distance between the image sensor 5A and the tire 2 becomes equal, regardless of the positions where the distance images are measured. FIG. 5 shows an example of coordinate conversion.

FIG. 5 is a diagram showing an example of a coordinate conversion process in the first embodiment according to the present invention.

A certain structure 51 is shown on the lower left side of FIG. 5. A coordinate system 1 is a coordinate system (coordinate system 1) used when the image sensor 5B actually measures the structure 51. The coordinate system moves every moment, and is an image including distortion when there is an attempt to reproduce an image of the structure 51 on the basis of a time-series distance image. Consequently, when coordinate conversion is performed on all distance images so that the distance images are converted into distance images measured from a certain coordinate system 2, distance images close to the actual shape are obtained. The noise elimination unit 102 performs coordinate conversion to correct a distance image acquired by the data acquisition unit 101. Thereby, a surface shape indicated by each distance image approximates to the actual shape, and thus it is possible to realize the calculation of the degree of wear with a high level of accuracy.

The noise elimination unit 102 performs a process of eliminating noise components from a distance image. The elimination of the noise components will be described with reference to FIGS. 6 and 7.

Figure 6:
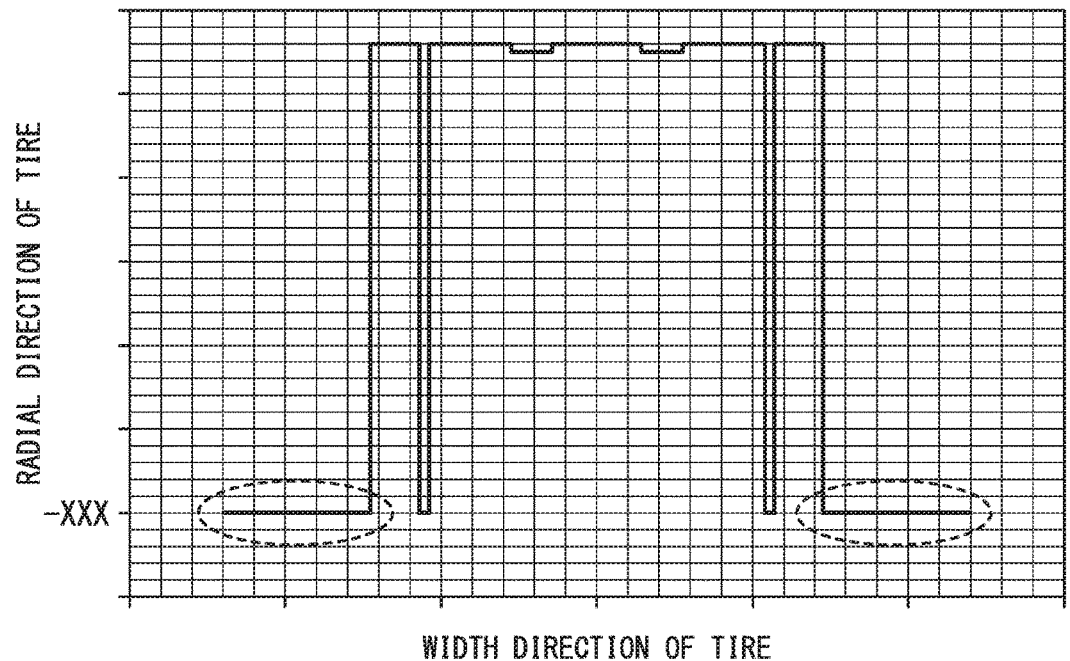
FIG. 6 is a diagram showing an example of a distance image of a tire surface in the first embodiment according to the present invention.

FIG. 6 is a diagram showing an example of a distance image of a tire surface in the first embodiment according to the present invention.

Figure 7:
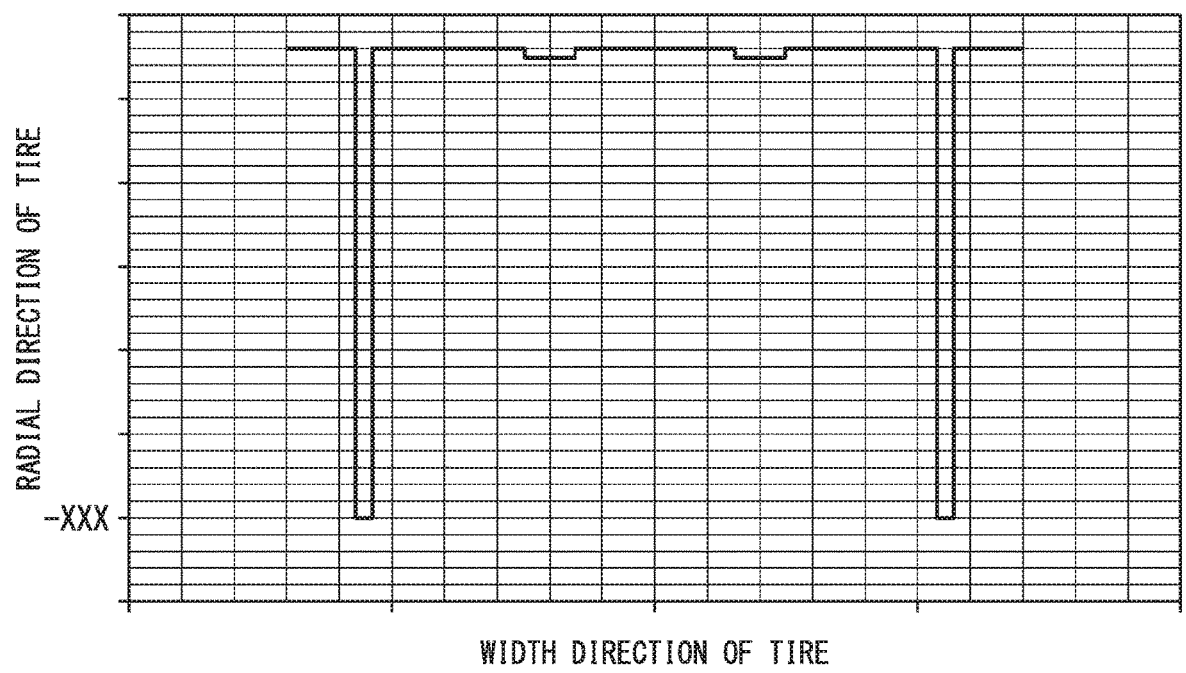
FIG. 7 is a diagram showing an example of a distance image after a noise elimination process for a tire surface in the first embodiment according to the present invention.

FIG. 7 is a diagram showing an example of a distance image after a noise elimination process for a tire surface in the first embodiment according to the present invention.

FIG. 6 is an example of a distance image showing the shape of the surface of the tire 2A which is obtained by the image sensor 5A at a certain time. The horizontal axis in FIG. 6 represents a position in the width direction of the tire, and the vertical axis represents a value in the radial direction of the tire. A visual field range is determined for the image sensor 5A, and a value at a position in the width direction of the tire beyond the visual field range indicates an abnormal value. In FIG. 6, data in a range surrounded by a dashed line is outside the visual field range of the image sensor 5A, and thus indicates an abnormal value (−XXX). The noise elimination unit 102 performs a noise elimination process of eliminating a portion including an abnormal value from a distance image. A distance image shown in FIG. 7 is a distance image obtained by excluding measurement failure ranges (ranges of abnormal values) at both ends from the distance image shown in FIG. 6 by the noise elimination unit 102.

The processing target extraction unit 103 distinguishes between a gradient portion in which a difference between the value of each of points included in the distance image and the value of an adjacent point is larger than a predetermined threshold value, and a flat portion in which the difference is smaller than the predetermined threshold value. The processing target extraction unit 103 extracts a processing target section for calculating the degree of wear from the gradient portion and the flat portion after the distinguishment. An observation target extraction process performed by the processing target extraction unit 103 will be described with reference to FIGS. 8 to 10 by taking a case where a part is the tire 2A as an example.

Figure 8:
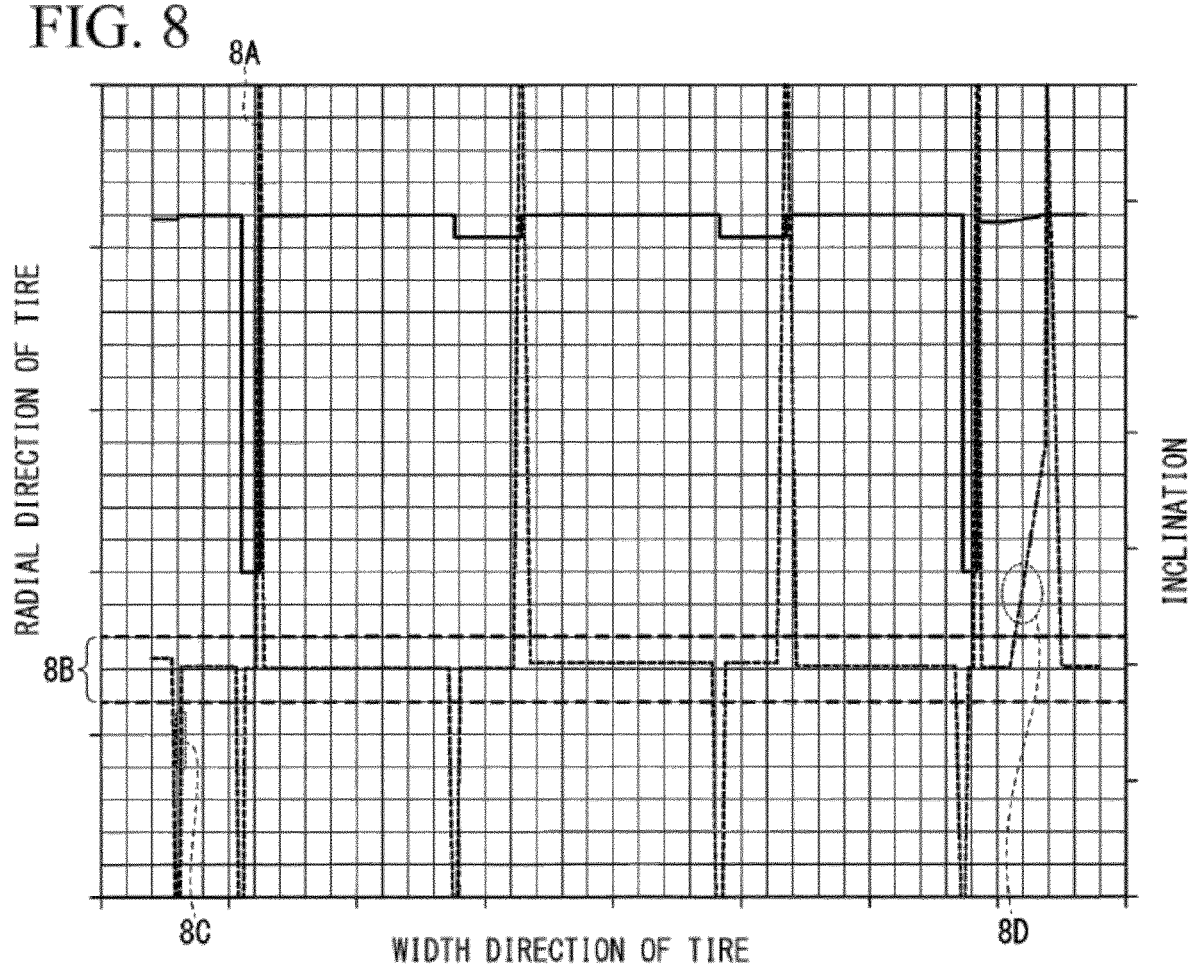
FIG. 8 is a first diagram showing a processing target extraction process for a distance image of a tire surface in the first embodiment according to the present invention.

FIG. 8 is a first diagram showing a processing target extraction process for a distance image of a tire surface in the first embodiment according to the present invention.

First, the processing target extraction unit 103 calculates a gradient at each point in a distance image from which noise is eliminated. Specifically, an inclination is calculated for each point $(x_i, y_i)$ by the following Expression (1) using information on points located before and after the point. A portion in which an absolute value of the inclination is larger than a threshold value is defined as a gradient section, and a portion in which an absolute value of the inclination is smaller than the threshold value and a measurement failure does not occur is defined as a flat section.

$$dy_i/dx_i = (y_{i+1} - y_i)/(x_{i+1} - x_i) \quad (1)$$

In the drawing, a graph 8A is a graph in which the inclination obtained by Expression (1) is plotted. In a case where the value of the inclination falls within a predetermined range 8B, the position thereof (a position in the width direction of the tire) is a flat section. A portion that does not fall within the range 8B is a gradient section. The processing target extraction unit 103 distinguishes between a flat section and a gradient section for each position in the width direction of the tire. Next, the processing target extraction unit 103 selects both ends (a left end 8C and a right end 8D) of a portion serving as a gradient section from a flat section in all sections.

Figure 9:
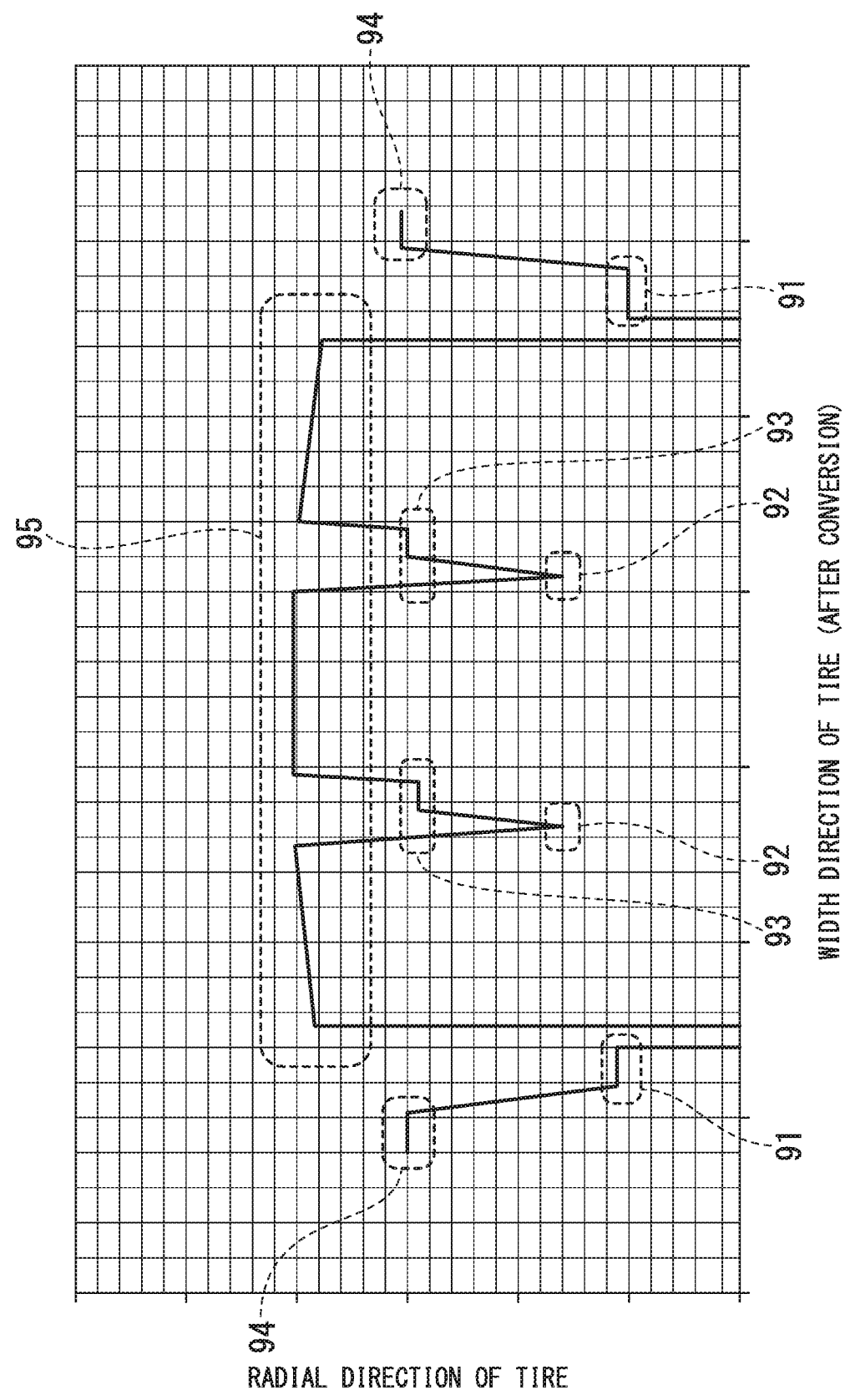
FIG. 9 is a second diagram showing a processing target extraction process for a distance image of a tire surface in the first embodiment according to the present invention.

FIG. 9 is a second diagram showing a processing target extraction process for a distance image of a tire surface in the first embodiment according to the present invention.

Next, the processing target extraction unit 103 performs coordinate conversion of a distance image so that an x coordinate of a left end of a selected portion is set to be 0 and an x coordinate of a right end is set to be 100. A distance image after the coordinate conversion is shown in FIG. 9.

According to the fact that values in the radial direction of the tire can be substantially classified into five stages of a range 91, a range 92, a range 93, a range 94, and a range 95, for example, in the distance image shown in FIG. 9, a user decides to previously classify values in the radial direction of the tire into five groups and inputs the number of groups to the wear inspection apparatus 10.

The processing target extraction unit 103 classifies values in the radial direction of the tire into five groups on the basis of the input. Specifically, the processing target extraction unit 103 aggregates the values in the radial direction of the tire and the frequency of appearance for each value to generate a histogram, and adjusts a classification width of the histogram so that there are four sections in which the frequency of appearance of the value in the radial direction of the tire is set to 0. The adjustment of the classification width may be performed by any method. For example, a method of increasing the classification width in order from 1 to 2 and 3 and obtaining the classification width when there are four sections in which the frequency of appearance is set to 0 (when values in the radial direction of the tire are classified into five groups) may be used.

Figure 10:
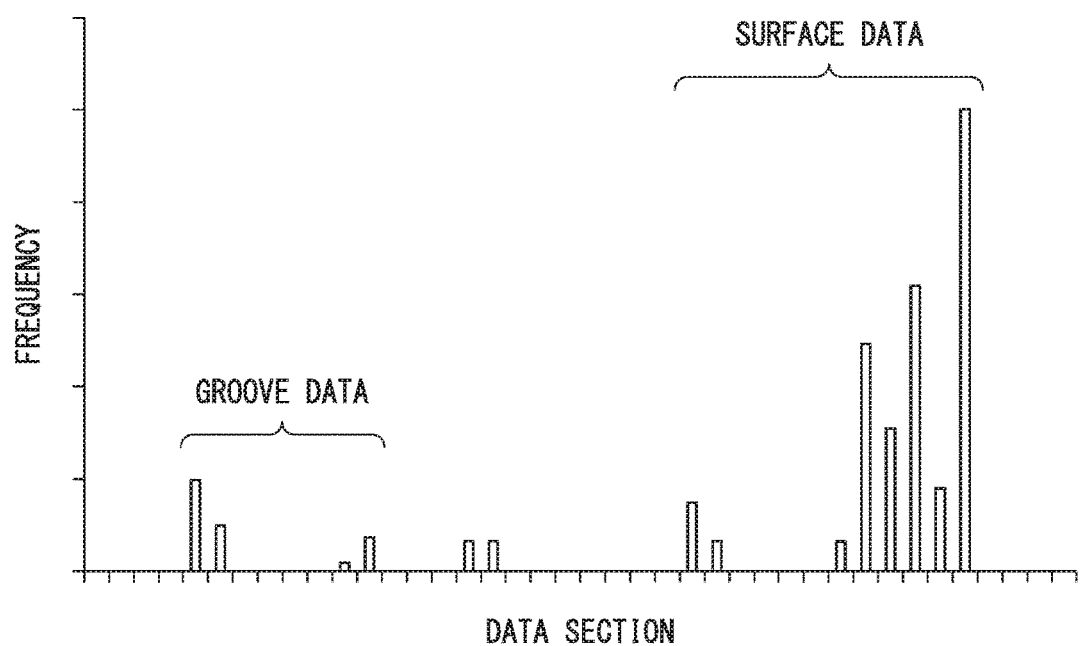
FIG. 10 is a third diagram showing a processing target extraction process for a distance image of a tire surface in the first embodiment according to the present invention.

FIG. 10 is a third diagram showing a processing target extraction process for a distance image of a tire surface in the first embodiment according to the present invention.

FIG. 10 is a histogram created by the processing target extraction unit 103 so that there are four sections in which the frequency of the value in the radial direction of the tire is set to 0.

For example, when values in the radial direction of the tire are classified in to five groups in the distance image shown in FIG. 9, the user inputs an instruction regarding how many groups are selected in ascending order (in a case of the present example, two groups) and how many groups are selected in descending order (in a case of the present example, two groups) to the wear inspection apparatus 10.

The processing target extraction unit 103 defines two sequential sections (in order from the left) from the smallest value in the radial direction of the tire in the histogram as groove data, and defines two sequential sections (in order from the right) from the biggest value in the radial direction of the tire in the histogram as surface data, on the basis of the input of the instruction. In the present example, the central group is not used.

By the above-described processing, the processing target extraction unit 103 extracts a processing target section. Specifically, the processing target extraction unit 103 extracts a portion (surface data) representing the shape of the surface of the tire 2A and a groove portion (groove data) in the distance image.

The approximation processing unit 104 calculates an approximation line of one or a plurality of flat portions extracted by the processing target extraction unit 103 with respect to the distance image, and calculates the degree of wear of the part from the approximation line and a worn portion included in the distance image.

Figure 11:
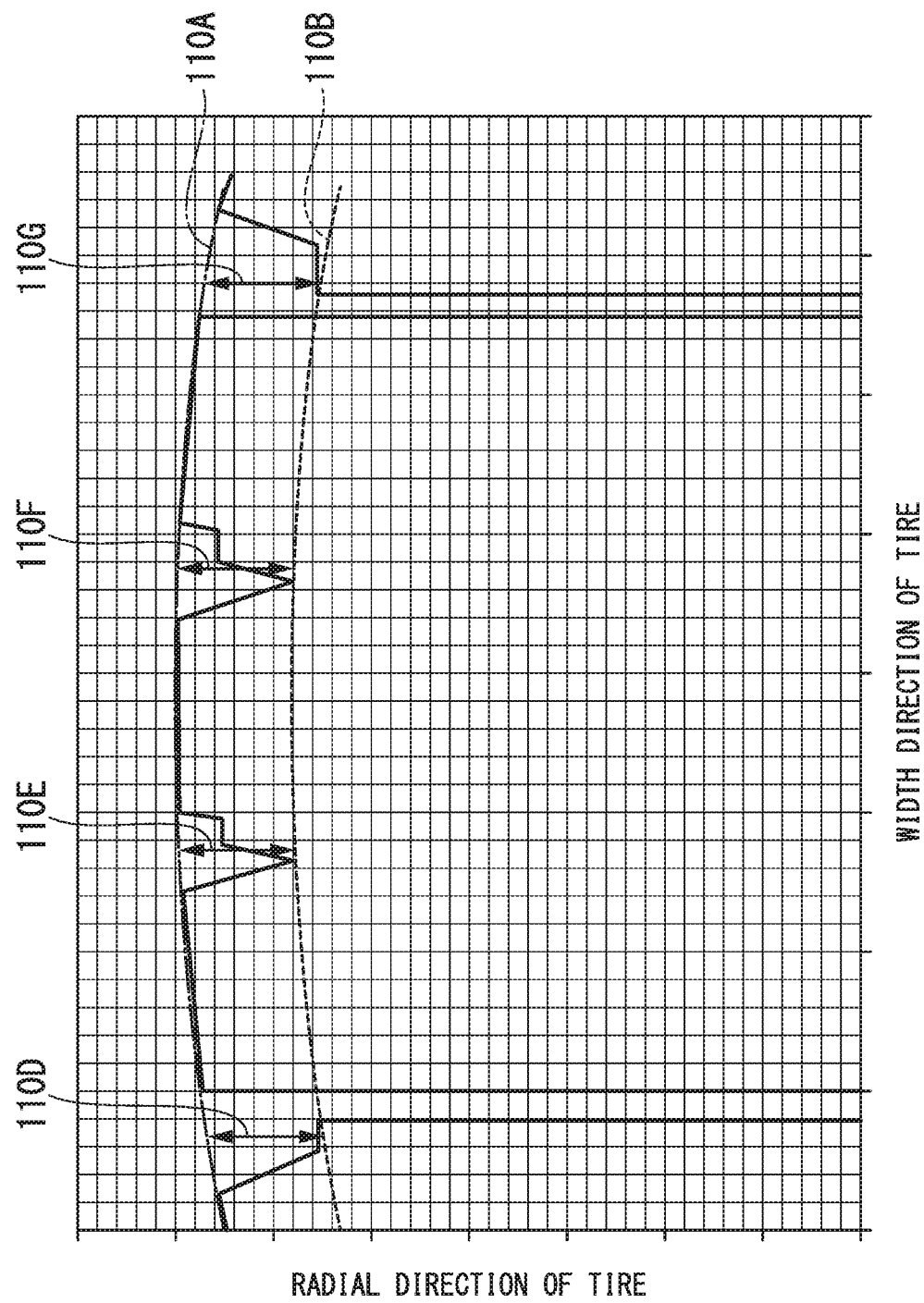
FIG. 11 is a diagram showing an example of an approximation curve of a tire surface in the first embodiment according to the present invention.

FIG. 11 is a diagram showing an example of an approximation curve of a tire surface in the first embodiment according to the present invention.

The approximation processing unit 104 performs polynomial approximation on the surface data extracted by the processing target extraction unit 103 by a cubic expression through regression analysis or the like to calculate a coefficient and a multiple determination coefficient (the value of a square of a multiple correlation coefficient). An approximation curve 110A is an approximation curve of the surface data calculated by the approximation processing unit 104. The approximation processing unit 104 performs polynomial approximation on the groove data extracted by the processing target extraction unit 103 by a cubic expression through regression analysis or the like to calculate a coefficient and a multiple determination coefficient. An approximation curve 110B is an approximation curve of the groove data calculated by the approximation processing unit 104. The approximation processing unit 104 calculates a difference (the depth of the groove) between the surface data and the groove data in the groove portion. Specifically, a difference (distances 110D, 110E, 110F, and 110G) between the value of the approximation curve 110A according to the surface data and the value of the approximation curve 110B according to the groove data in the range 91 (values on the horizontal axis are 5 and 95) and the range 92 (values on the horizontal axis are 35 and 65) shown in FIG. 9 is calculated.

The wear data recording unit 105 records the coefficients, multiple determination coefficients, the value of the depth of the groove, and positional information in the width direction of the tire corresponding to each groove of the approximation curves 100A and 110B calculated by the approximation processing unit 104 in the storage unit 107.

The input and output unit 106 is an interface for inputting and outputting the user's operation or data. For example, the input and output unit 106 is a microphone, a touch panel, a display, an input and output port, or the like. The user can give an instruction for starting a process of calculating the degree of wear, can input data, and the like through the input and output unit 106. The input and output unit 106 can display the approximation curve calculated by the approximation processing unit 104 on the display.

The storage unit 107 is constituted by a non-volatile storage medium or a volatile storage medium, and stores various data such as the coefficient of the approximation curve.

Next, an operation example of the wear inspection apparatus 10 will be described with reference to FIG. 12.

Figure 12:
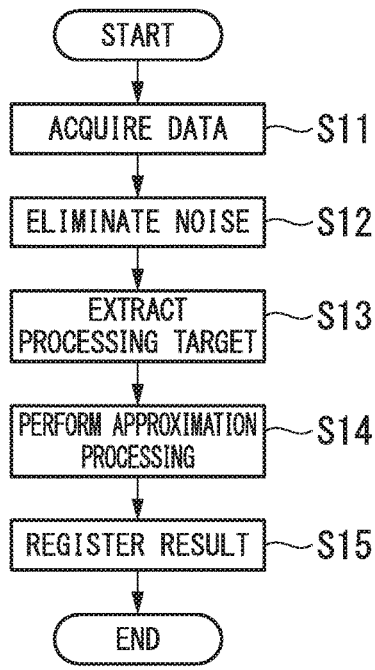
FIG. 12 is a flowchart showing an example of processing of the wear inspection apparatus in the first embodiment according to the present invention.

FIG. 12 is a flowchart showing an example of processing of the wear inspection apparatus in the first embodiment according to the present invention.

In the operation example shown in FIG. 12, first, the data acquisition unit 101 acquires surface shape data (distance image) measured by the image sensor 5A on the basis of a distance to the tire 2A (step S11). In step S11, the data acquisition unit 101 stores the input data in a predetermined storage region of the storage unit 107. In this case, the input and output unit 106 may display the distance image on the display and receive, from the user, an input regarding how many sections in which the frequency of a value in the radial direction of the tire is set to 0 are set, how many pieces of surface data and groove data are selected from the distribution of the values in the histogram described in FIG. 10, or the like in a process of extracting the surface data and the groove data using the histogram. The number of sections in which the frequency is set to 0, and the like may vary depending on the type of tire or wear conditions.

Next, the noise elimination unit 102 performs a noise elimination process of eliminating noise from the distance image which is input in step S11 (step S12). For example, the noise elimination unit 102 performs coordinate conversion on distance images successively measured by the image sensor 5A with respect to the tire 2A approaching as the vehicle 1 travels, and performs correction such that a relative positional relationship between the image sensor 5A and the tire 2A can be treated as the same for all of the distance images. The noise elimination unit 102 excludes an abnormal value in a measurement failure range of the image sensor 5A.

Next, the processing target extraction unit 103 performs a processing target extraction process on the distance image after the noise elimination (step S13). For example, the processing target extraction unit 103 acquires one distance image measured at a certain point in time from the distance image after the noise elimination. The processing target extraction unit 103 obtains an inclination at each point included in the distance image, and performs classification into a flat portion and a gradient portion. The processing target extraction unit 103 extracts data (surface data, groove data) used for the calculation of an approximation curve from the flat portion and the gradient portion obtained by the classification. The processing target extraction unit 103 creates a histogram as described in FIG. 10 to extract surface data and groove data.

Next, the approximation processing unit 104 performs approximation processing using the surface data and the groove data extracted in step S13 (step S14). Specifically, the approximation processing unit 104 performs curve fitting on a portion of the distance image corresponding to the surface data through regression analysis or the like to calculate an approximation curve (for example, the approximation curve 110A shown in FIG. 11) of the surface of the tire 2A from which groove portions generated in the tire 2A are eliminated. Similarly, the approximation processing unit 104 performs curve fitting on a portion of the distance image corresponding to the groove data to calculate an approximation curve (for example, the approximation curve 110B shown in FIG. 11) connecting the bottoms of the groove portions generated in the tire 2A. The approximation processing unit 104 calculates a difference (the depth of the groove) between the surface data and the groove data of the tire 2A at a position corresponding to the groove data extracted in step S13.

Next, the wear data recording unit 105 records the approximation curves of the surface data and the groove data calculated by the approximation processing unit 104, the depth of the groove portion, and positional information on each groove portion in the width direction of the tire in the storage unit 107 (step S15).

The processes of steps S13 to S15 are performed all distance images having been subjected to the noise elimination process in step S12. Thereby, wear data indicating the degree of wear is obtained over a surface range of the tire 2 which is measured by the image sensor 5A.

A case where the degree of wear of the surface of the tire 2 of the vehicle is calculated has been described so far. Next, a method of calculating the amount of wear of the surface of the pantograph shoe 3 will be described along the processes of the flowchart of FIG. 12. In a case of the pantograph shoe 3, wear occurs on a surface in the vertical direction due to contact with the electric-car line 4 (the concave portion 31 shown in FIG. 4). First, an approximation straight line of the surface of the pantograph shoe is calculated on the basis of a distance image of the surface of the pantograph shoe which is measured by the image sensor 5B at a certain time. Next, the amount of wear is obtained by integrating a difference between the approximation straight line and the concave portion in the distance image.

First, the data acquisition unit 101 acquires surface shape data (distance image) including the shape of the surface of the pantograph shoe which is measured by the image sensor 5B as the vehicle 1 travels (step S11). Next, the noise elimination unit 102 performs a noise elimination process (step S12). First, the noise elimination unit 102 performs coordinate conversion on the distance images to correct distortion between the distance images. Since the distance image also includes a structure (for example, the side surface of the vehicle body) other than the pantograph shoe portion, the noise elimination unit 102 detects the pantograph shoe portion to eliminate a distance image of the other portion. In the detection, the noise elimination unit 102 determines that the distance image includes the pantograph shoe 3 when the number of points exceeding a certain threshold value is equal to or greater than a fixed value among distance images measured at respective times, using a property that the pantograph shoe is farthest from the body of the vehicle 1 (the value in the horizontal direction of the vehicle is largest) among all parts included in the distance image. The noise elimination unit 102 extracts a portion including the pantograph shoe 3 from the distance image including the pantograph shoe 3. The noise elimination unit 102 performs the same process on each of the distance images measured at the respective times. The noise elimination unit 102 assumes that the traveling speed of a train is constant from the number of pieces of data n in a time slot in which it is determined that the distance image includes the pantograph shoe 3, and a length x of the pantograph shoe in the traveling direction of the vehicle, and calculates a length dx=x/n of the pantograph shoe included in one distance image. Here, dx is equivalent to a distance at which the vehicle 1 travels from the measurement of a certain distance image to the measurement of the next distance image. Here, dx is used when the amount of wear (volume) is calculated later. The following process is performed on a distance image measured at each time after the noise elimination process. Next, the noise elimination unit 102 performs a process of eliminating a range indicating an abnormal value (measurement failure range) from the distance image.

Figure 13:
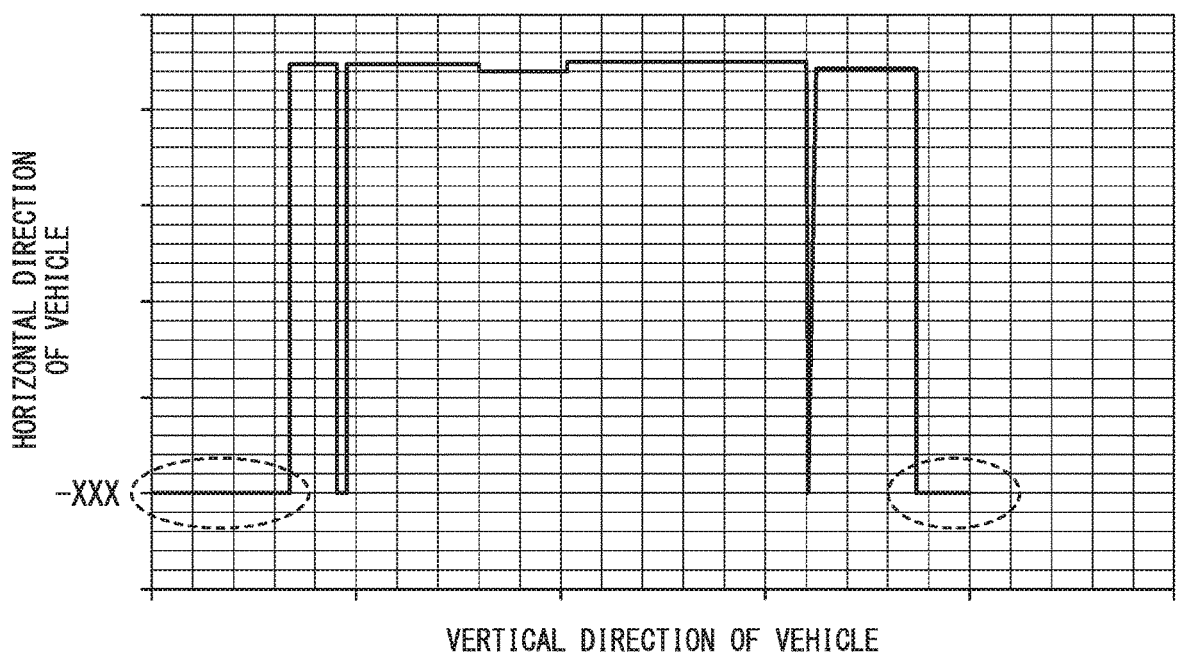
FIG. 13 is a diagram showing an example of a distance image of the surface of a pantograph shoe in the first embodiment according to the present invention.

FIG. 13 is a diagram showing an example of a distance image of the surface of a pantograph shoe in the first embodiment according to the present invention.

Figure 14:
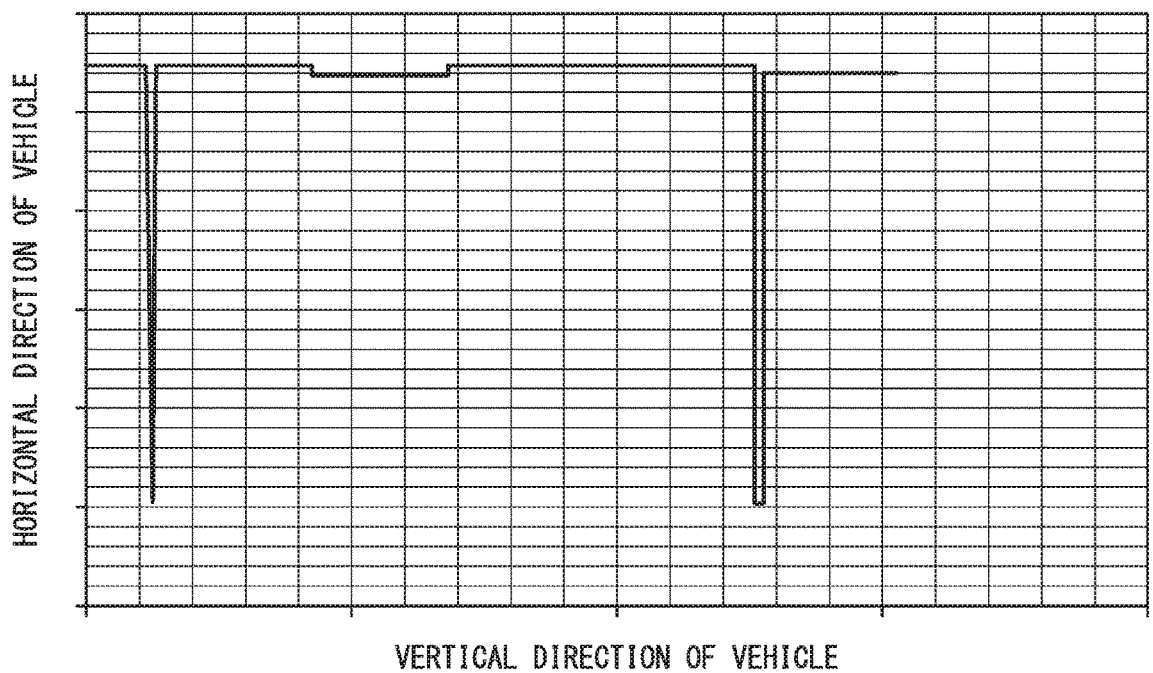
FIG. 14 is a first diagram showing an example of a distance image after a noise elimination process for the surface of a pantograph shoe in the first embodiment according to the present invention.

FIG. 14 is a first diagram showing an example of a distance image after a noise elimination process for the surface of a pantograph shoe in the first embodiment according to the present invention.

Figure 15:
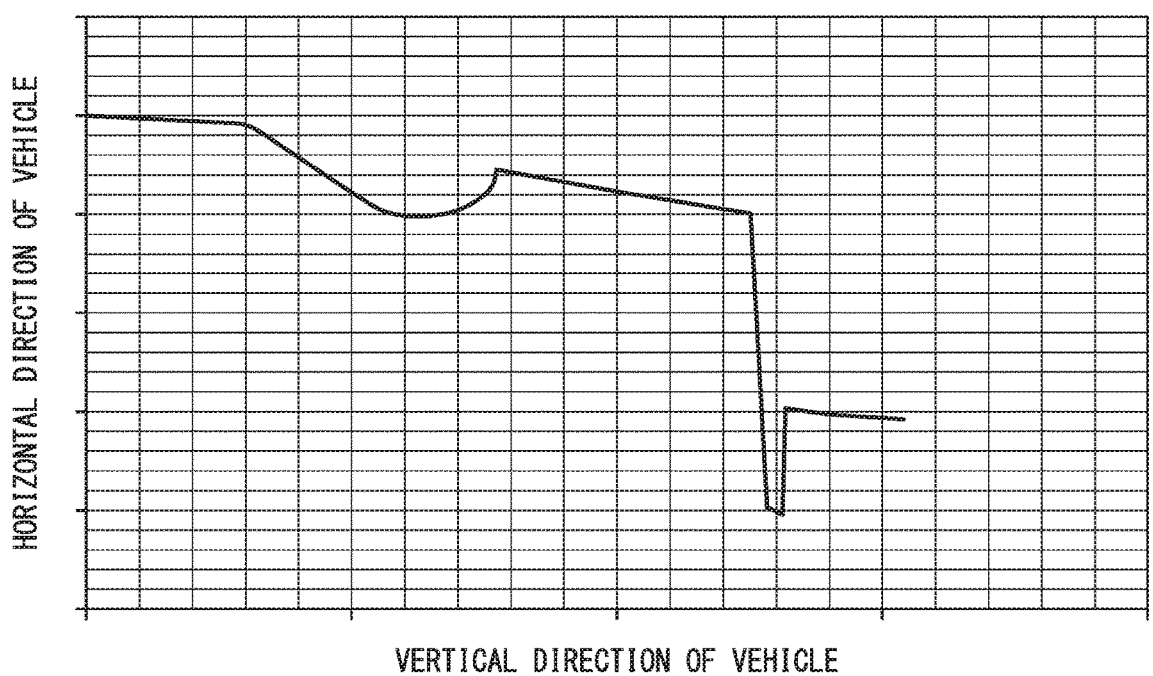
FIG. 15 is a second diagram showing an example of a distance image after a noise elimination process for the surface of a pantograph shoe in the first embodiment according to the present invention.

FIG. 15 is a second diagram showing an example of a distance image after a noise elimination process for the surface of a pantograph shoe in the first embodiment according to the present invention.

FIG. 13 is a certain distance image showing the shape of the surface of the pantograph shoe 3 which is measured by the image sensor 5B. The horizontal axis in FIG. 13 represents a position in the vertical direction of the vehicle, and the vertical axis represents a value in the horizontal direction of the vehicle. Similarly to a case of the tire 2, a visual field range is determined for the image sensor 5B, and a distance image at a position beyond the visual field range indicates an abnormal value (a range surrounded by a dashed line). The noise elimination unit 102 performs a process of eliminating an abnormal value from the distance image. The distance image shown in FIG. 14 is a distance image obtained after abnormal values at both ends of the distance image are eliminated. For a portion in which an abnormal value is detected in regions other than the both ends of the obtained distance image, the noise elimination unit 102 performs linear interpolation by connecting normal values adjacent to end points of a sequence of points indicating abnormal values to each other, or the like. The distance image shown in FIG. 15 is a distance image after the linear interpolation process is performed.

Next, the processing target extraction unit 103 performs a processing target extraction process on a distance image from which noise eliminated (step S13).

Figure 16:
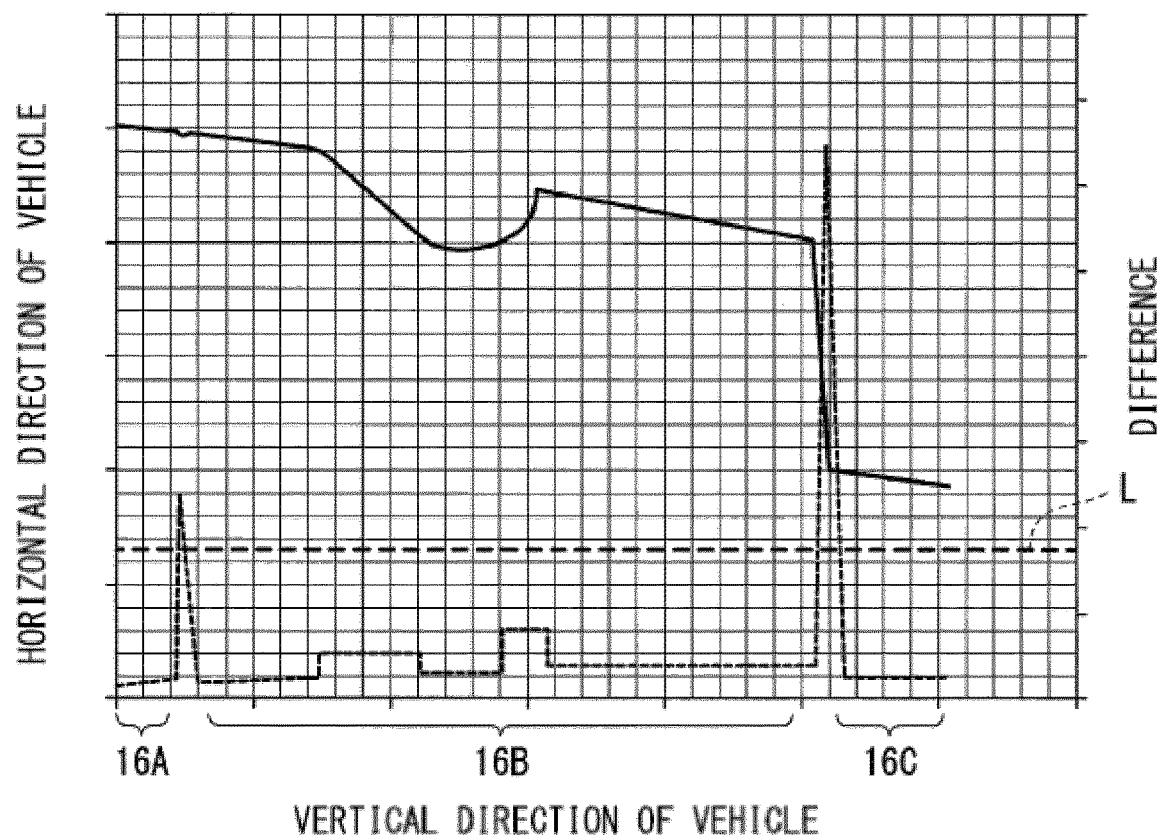
FIG. 16 is a first diagram showing a processing target extraction process for a distance image of the surface of a pantograph shoe in the first embodiment according to the present invention.

FIG. 16 is a first diagram showing a processing target extraction process for a distance image of the surface of a pantograph shoe in the first embodiment according to the present invention.

Figure 17:
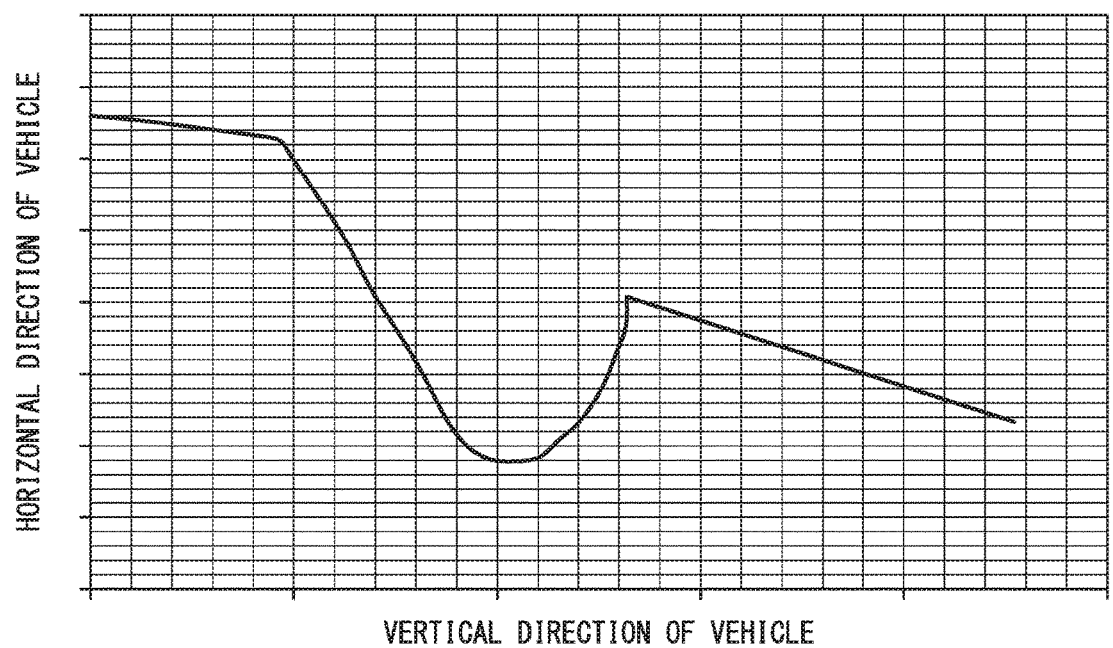
FIG. 17 is a second diagram showing a processing target extraction process for a distance image of the surface of a pantograph shoe in the first embodiment according to the present invention.

FIG. 17 is a second diagram showing a processing target extraction process for a distance image of the surface of a pantograph shoe in the first embodiment according to the present invention.

First, the processing target extraction unit 103 calculates an inclination for each point $(x_i, y_i)$ using Expression (1). The processing target extraction unit 103 compares the inclination with a predetermined threshold value L to distinguish between a flat section and a gradient section for each position of the pantograph shoe 3 in the vertical direction. The processing target extraction unit 103 divides the distance image with the gradient section as a boundary. The processing target extraction unit 103 extracts a largest section 16B among a section 16A, the section 16B, and a section 16C which are a plurality of flat sections obtained by the division. The distance image shown in FIG. 17 is a distance image of the section 16B extracted by the processing target extraction unit 103. The section extracted by the processing target extraction unit 103 is referred to as a valid section.

Next, the approximation processing unit 104 performs approximation processing using the distance image of the section extracted in step S13 (step S14).

Figure 18:
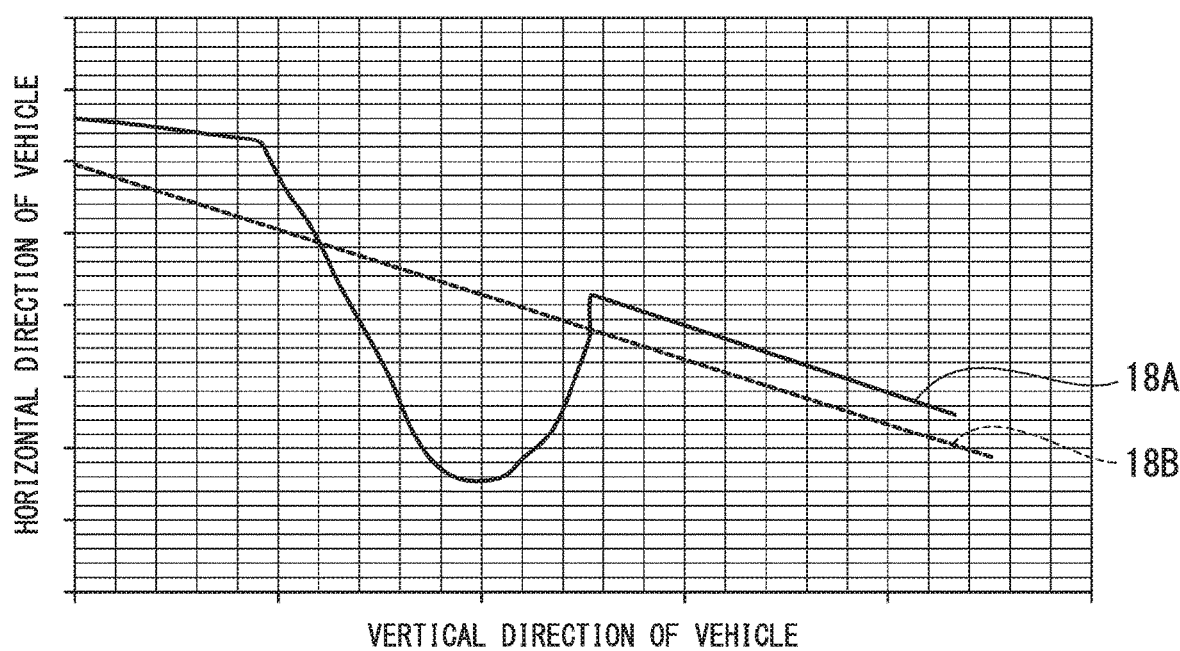
FIG. 18 is a first diagram showing approximation processing for a distance image of the surface of a pantograph shoe in the first embodiment according to the present invention.

FIG. 18 is a first diagram showing approximation processing for a distance image of the surface of a pantograph shoe in the first embodiment according to the present invention.

Figure 19:
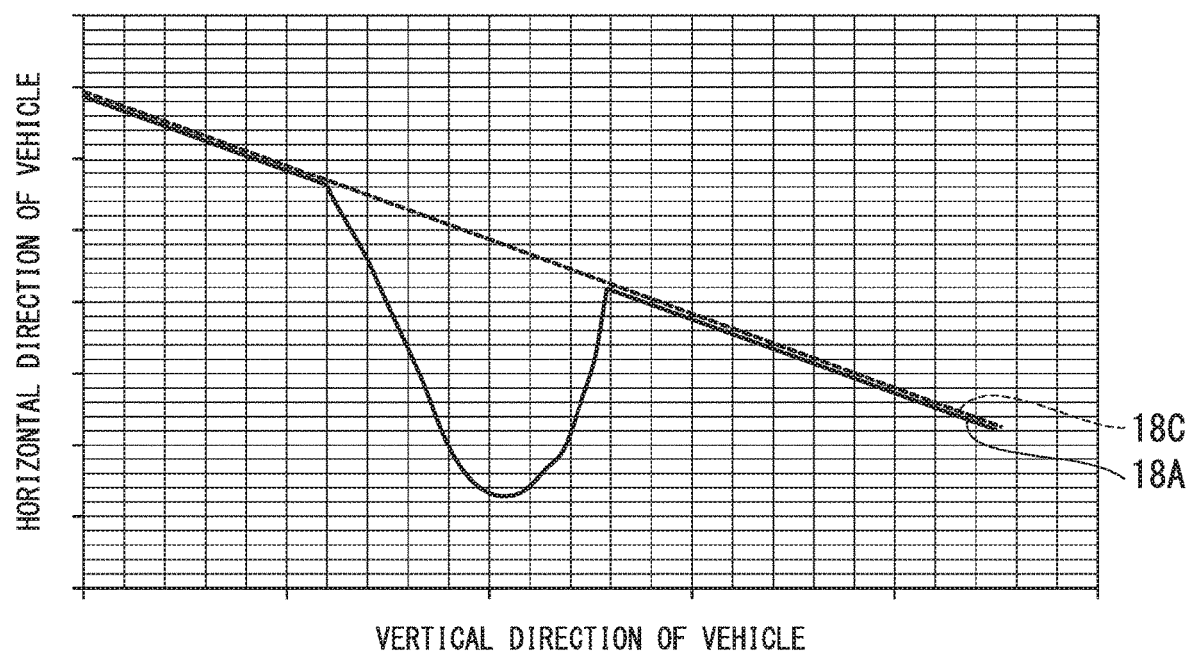
FIG. 19 is a second diagram showing approximation processing for a distance image of the surface of a pantograph shoe in the first embodiment according to the present invention.

FIG. 19 is a second diagram showing approximation processing for a distance image of the surface of a pantograph shoe in the first embodiment according to the present invention.

The approximation processing unit 104 performs linear approximation on a curve 18A indicated by a distance image of the valid section extracted by the processing target extraction unit 103 to calculate an approximation straight line 18B. Since the curve 18A includes a portion recessed due to wear, an unworn portion in the surface of the pantograph shoe 3 has a value in the horizontal direction of the vehicle which is larger than that of the approximation straight line 18B. Consequently, the approximation processing unit 104 extracts only a sequence of points having a value larger than that of the approximation straight line 18B, and performs linear approximation again on the extracted sequence of points. Then, the approximation processing unit 104 calculates an approximation straight line 18C for a sequence of points of the surface shown in FIG. 19. The approximation processing unit 104 repeatedly performs linear approximation until an approximation straight line for a distance image of an unworn surface portion of the pantograph shoe 3 is calculated (for example, until a multiple determination coefficient is set to 0.95 or greater) in accordance with the magnitude of a recessed amount of wear.

The approximation processing unit 104 calculates the approximation straight line, when the approximation processing unit calculates the amount of wear of the pantograph shoe 3. First, the approximation processing unit 104 performs inclination correction. The inclination correction is a process of correcting an inclination caused by the generation of an inclination of a laser irradiation angle of the image sensor 5B with respect to the surface of the pantograph shoe 3 in a case where the height of the image sensor 5B is different from the height of the pantograph shoe 3, or the like. An example of the process of correcting an inclination will be described. First, the approximation processing unit 104 calculates an inclination angle θ from an inclination (denoted by a) of the calculated approximation straight line 18C by the following Expression (2).

$$\theta = \mathrm{Tan}^{-1}(1/a) \quad (2)$$

Next, the approximation processing unit 104 corrects an inclination in the Z-direction (the horizontal direction of the paper shown in FIG. 4) by the following Expression (3).

$$Z'_i = (Z_i - (X_i - X_0)/\mathrm{Tan}\,\theta) \times \sin\theta \quad (3)$$

Here, $X_0$ denotes a starting value of a distance image in the X-axis direction, and $X_i$ denotes any value between the starting value of the distance image in the X-axis direction and an ending value. In addition, $Z_i$ denotes a value in the Z-axis direction corresponding to $X_i$. Further, $Z'_i$ denotes a value after correction.

Next, the approximation processing unit 104 corrects an inclination in the X-direction (the vertical direction of the paper shown in FIG. 4) by the following Expressions (4) and (5).

$$dX = \mathrm{sqrt}((Z_i - Z_{i-1})^2 + (X_i - X_{i-1})^2 - (Z'_i - Z'_{i-1})^2) \quad (4)$$

$$X'_i = X'_{i-1} + dX \quad (5)$$

Next, the approximation processing unit 104 integrates a difference between a curve indicated by the distance image in a valid section after inclination correction and an approximation straight line, and calculates an area of a portion surrounded by the curve after the inclination correction and the approximation straight line. The calculated value is multiplied by dx to obtain the volume of a worn portion of the surface of the pantograph shoe 3 corresponding to the passage of the vehicle 1 per unit time. The approximation processing unit 104 performs the same processing on the distance images determined to include the pantograph shoe 3 by the noise elimination unit 102, integrates values obtained by the processing, and calculates the total amount of wear of the pantograph shoe 3. Next, the wear data recording unit 105 records the amount of wear calculated by the approximation processing unit 104 in the storage unit 107 (step S15). In this manner, the wear inspection apparatus 10 can calculate the amount of wear of the pantograph shoe 3 on the basis of the flowchart of FIG. 12. The degree of wear of the electric-car line 4 can be calculated in the same manner.

In the related art, only information on the depth of a groove in the severest worn portion has been measured as the degree of wear occurring in the tire 2. According to the wear inspection apparatus 10 of the present embodiment, it is possible to obtain more detailed conditions and useful information such as the amount of wear at any place and flatness and distortion of the tire 2 by using not only limited information such as only a maximum value of a worn portion but also an approximation curve over the entire surface of the tire 2 and the position and depth of a groove caused by wear. Since a distance image can be integrated into information such as a coefficient of the approximation curve, it is possible to reduce the amount of data stored and to accumulate data for a long period of time. Thereby, it is possible to perform analysis on the basis of a larger amount of data.

Second Embodiment

Hereinafter, a wear inspection apparatus according to a second embodiment of the present invention will be described with reference to FIGS. 20 and 21.

Figure 20:
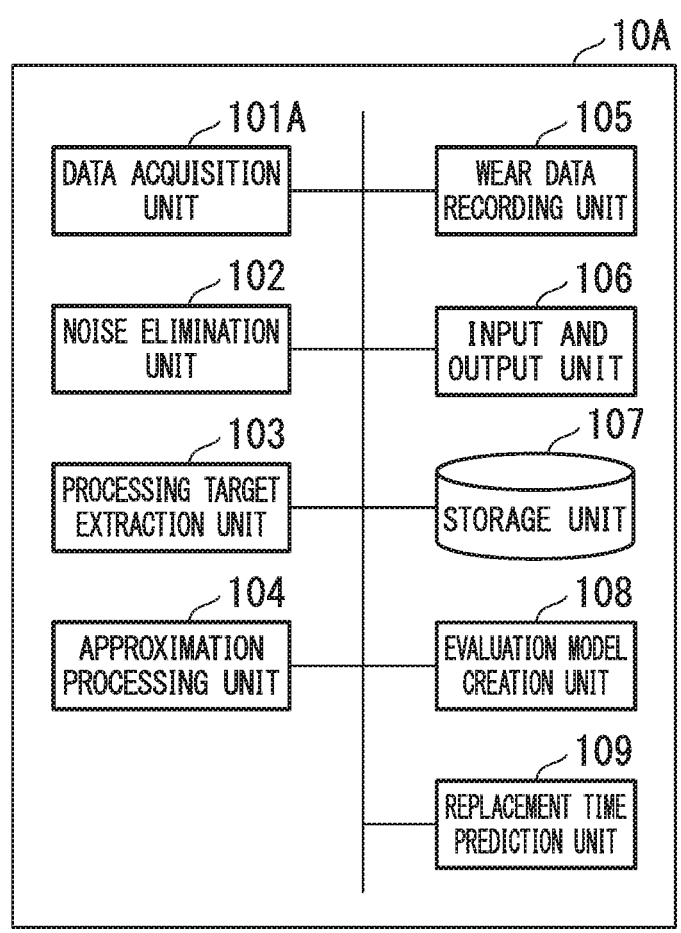
FIG. 20 is a block diagram showing a configuration example of a wear inspection apparatus in a second embodiment according to the present invention.

FIG. 20 is a block diagram showing a configuration example of a wear inspection apparatus in the second embodiment according to the present invention.

In a configuration according to the second embodiment of the present invention, the same functional units as the functional units constituting the wear inspection apparatus 10 according to the first embodiment of the present invention will be denoted by the same reference numerals and signs, and a description thereof will be omitted.

A wear inspection apparatus 10A according to the second embodiment provides a function of predicting the amount of wear and predicting the time for replacement of a part due to wear. In a case where the amount of wear of a tire 2 or the like is predicted, analysis associated with operation data, such as the shape of a route or a traveling speed, which is regarded as affecting the progress of wear becomes effective. The wear inspection apparatus 10A creates an evaluation model for predicting the degree of wear from the operation data by associating the operation data and wear data with each other, and evaluates the degree of wear occurring in a part of a vehicle 1 on the basis of the created evaluation model and operation data of the vehicle 1 serving as a prediction target.

The wear inspection apparatus 10A according to the second embodiment includes an evaluation model creation unit 108 and a replacement time prediction unit 109 in addition to the configuration of the first embodiment, and includes a data acquisition unit 101A instead of the data acquisition unit 101.

The data acquisition unit 101A acquires operation data on a vehicle 1 in addition to a distance image measured by an image sensor 5. The operation data is data such as a traveling speed, a traveling time, and a traveling distance of the vehicle 1, the shape of a route on which the vehicle 1 travels (the proportion of a curve or a slope, or the like), and weather.

The evaluation model creation unit 108 creates an evaluation model for evaluating the degree of wear on the basis of the operation data on the vehicle 1 which is acquired by the data acquisition unit 101A and wear data recorded with regard to the vehicle 1 by the wear data recording unit 105. The wear data includes coefficients of approximation curves of a surface and a groove portion and information on the depth of the groove in a case of the tire 2 of the vehicle 1. The wear data is the amount of wear in a case of the pantograph shoe 3.

The replacement time prediction unit 109 predicts the future wear conditions, the time for replacement, and the like of a part to be consumed due to wear of the tire 2 or the like, on the basis of the current operation data on the vehicle serving as a prediction target for the time for replacement and the evaluation model created by the evaluation model creation unit 108.

Next, a process of predicting the time for replacement due to wear will be described with reference to FIG. 21 by taking the tire 2 included in the vehicle 1 in the second embodiment as an example.

Figure 21:
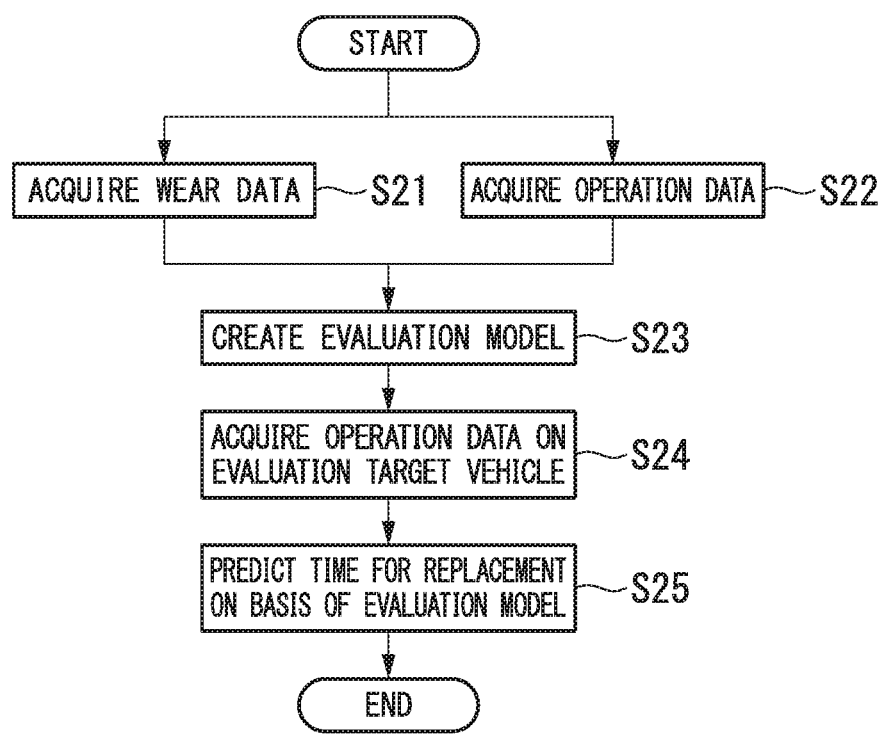
FIG. 21 is a flowchart showing an example of processing of the wear inspection apparatus in the second embodiment according to the present invention.

FIG. 21 is a flowchart showing an example of processing of the wear inspection apparatus in the second embodiment according to the present invention.

As an example, it is assumed that the wear data on the tire 2 calculated by the approximation processing unit 104 with respect to the same type of vehicle 1 as the vehicle 1 serving as a prediction target for the time for replacement is recorded in a storage unit 107 in association with the date of measurement of a distance image used for the calculation of the wear data. It is assumed that a standard of the degree of wear for determining the replacement of the tire 2 of the vehicle 1 (for example, the replacement is performed when a predetermined number of grooves having a predetermined depth or greater are generated, or the like) is recorded in the storage unit 107 in advance.

First, the evaluation model creation unit 108 acquires the wear data on the vehicle 1 by reading out the wear data from the storage unit 107 (step S21). The data acquisition unit 101A acquires the operation data on the vehicle 1 from a system in which the operation data on the vehicle is accumulated (step S22). In this case, the data acquisition unit 101A acquires the operation data on the vehicle 1 in a period corresponding to the wear data acquired by the evaluation model creation unit 108.

Next, the evaluation model creation unit 108 creates an evaluation model by machine learning (step S23). For example, the evaluation model creation unit 108 creates learning data corresponding to the amount of wear data acquired, using wear data according to a certain distance image and operation data measured on the date closest to the measurement date of the distance image as one learning data. The evaluation model creation unit 108 performs machine learning processing using a method such as a decision tree. For example, when the decision tree is used, it is possible to extract a condition for making the tire 2 have such a degree of wear (regarding whether such a degree of wear occurs depending on what kind of tendency indicated by the operation data) with respect to various degrees of wear included in the wear data. An evaluation model indicating a relationship between the degree of wear occurring in the tire 2 and operation conditions of the vehicle 1 indicated by the operation data, such as "a groove is generated at a specific position of the tire 2 when the vehicle travels in a certain section (having many curves) for a period of time X or longer" or "the surface of the tire 2 has a shape indicated by a predetermined approximation curve when the vehicle travels at a speed Y or higher for a period of time Z or longer", is obtained. The evaluation model creation unit 108 records the evaluation model in the storage unit 107 as an evaluation model.

Next, a user inputs the latest operation data on the vehicle 1 to the wear inspection apparatus 10A. The data acquisition unit 101A acquires the operation data on the vehicle 1 (step S24). The data acquisition unit 101A outputs the operation data on the vehicle 1 to the replacement time prediction unit 109. Next, the replacement time prediction unit 109 predicts the time for replacement on the basis of the evaluation model (step S25). For example, in a case where the degree of wear of the tire 2 is indicated for each traveling section and each traveling time of the vehicle 1 in the evaluation model, the replacement time prediction unit 109 evaluates the degree of wear of the vehicle 1 by applying a traveling section and a traveling time of the vehicle 1 which are included in the acquired operation data on the vehicle 1 to the evaluation model. In a case where the evaluated degree of wear satisfies a standard of the degree of wear for determining the replacement of the tire 2 (in a case where severer wear occurs) with reference to the standard of the degree of wear for determining the replacement of the tire 2, the replacement time prediction unit 109 determines that it is time to replace the tire 2. In a case where the evaluated degree of wear does not satisfy the degree of wear for determining the replacement of the tire 2, the replacement time prediction unit 109 acquires a condition of the operation data which satisfies the standard of the degree of wear for determining the replacement of the tire 2, with reference to the evaluation model. The replacement time prediction unit 109 predicts the time for replacement by comparing the condition of the operation data which satisfies the standard with the operation data on the vehicle 1. For example, in a case where the evaluation model indicates that the degree of wear equivalent to the replacement of the tire 2 has occurred when a traveling time is a period of time X1 or longer with respect to the vehicle 1 having traveled in the same section as the traveling section of the vehicle 1 and the operation data on the vehicle 1 indicates that the traveling time of the vehicle 1 is a period of time X2 (the relation of X1>X2 is set), the replacement time prediction unit 109 calculates a traveling time X2−X1 until the time for replacement of the tire 2. The replacement time prediction unit 109 outputs the calculated traveling time until the time for replacement of the tire 2 to an input and output unit 106. The input and output unit 106 displays the traveling time until the time for replacement on a display. Thereby, the user can ascertain the time for replacement of the tire 2.

In the related art, only limited information such as a maximum value has been recorded with respect to the amount of wear of a part of the vehicle 1. For this reason, even when an evaluation model is created by performing machine learning using wear data and operation data, various degrees of wear occurring in parts cannot be predicted, and thus it is not possible to obtain a highly accurate evaluation model. According to the wear inspection apparatus 10A of the present embodiment, not only the maximum value of the amount of wear but also the shape of a surface deformed due to wear and the amount of wear of a specific position can be used as factors, and thus it is possible to expect an improvement in the accuracy of the evaluation model. Thereby, the user can ascertain detailed degrees of wear of parts to previously prevent the occurrence of abnormality, can ascertain the appropriate time for replacement of parts to improve the efficiency of stock management of worn parts, and can appropriately perform maintenance (inspection, repair, and the like) of the worn parts every day.

<Others>

For example, when there is a correlation between the wear of the tire 2 and the repair of a road surface on which the vehicle 1 travels, data obtained by measuring, for example, a change in the shape of the road surface on which the vehicle 1 travels, or the like is accumulated, and a relationship between wear data analyzed by the wear inspection apparatus 10 (or the wear inspection apparatus 10A) and the change in the shape of the road surface is analyzed by machine learning or the like, thereby contributing to the examination of a better road surface repairing method such as the decision of an appropriate cutting method.

In addition, it is possible to appropriately replace a component in the above-described embodiment with a well-known component without departing from the scope of the present invention. The technical scope of the present invention is not limited to the above-described embodiment, and various modifications can be added without departing from the scope of the present invention.

INDUSTRIAL APPLICABILITY

According to the above-described wear inspection apparatus and wear inspection method, it is possible to measure not only limited information such as only a maximum value of a worn portion of a part but also the overall wear conditions of the part and the amount of wear in any worn portion.

REFERENCE SIGNS LIST

1 Vehicle
2, 2A, 2B Tire
4 Electric-car line
3 pantograph shoe
6 Side wall
7 Hole
5, 5A, 5B Image sensor
10, 10A Wear inspection apparatus
101, 101A Data acquisition unit
102 Noise elimination unit
103 Processing target extraction unit
104 Approximation processing unit
105 Wear data recording unit
106 Input and output unit
107 Storage unit
108 Evaluation model creation unit
109 Replacement time prediction unit

What is claimed is:

1. A wear inspection apparatus comprising:
a data acquisition unit which is configured to acquire surface shape data including information indicating a shape of a surface of a part worn as a vehicle travels;
a processing target extraction unit which is configured to distinguish between a gradient portion in which a difference between a value of each point included in the surface shape data and a value of an adjacent point is larger than a predetermined threshold value, and a flat portion in which the difference is smaller than the predetermined threshold value in the surface shape data, and extract a processing target section for calculating a degree of wear in the surface shape data from the gradient portion and the flat portion after the distinguishment;
an approximation processing unit which is configured to calculate an approximation line of a worn portion included in the acquired surface shape data and an approximation line of an unworn portion included in the surface shape data, and calculate a degree of wear of the part from a difference between the approximation line of the worn portion and the approximation line of the unworn portion;
an evaluation model creation unit which is configured to create an evaluation model for evaluating the degree of wear of the part according to operation conditions of the vehicle on the basis of the degree of wear of the part which is calculated by the approximation processing unit and operation data indicating the operation conditions of the vehicle including the part; and
a replacement time prediction unit which is configured to acquire operation data on a target vehicle serving as an evaluation target, evaluate a degree of wear occurring in a part of the target vehicle on the basis of the operation data and the evaluation model, and predict a time for replacement of the part of the target vehicle for which the degree of wear is evaluated, on the basis of information indicating the time for replacement of the part which is determined in association with the degree of wear of the part of the target vehicle.

2. The wear inspection apparatus according to claim 1, further comprising:
a noise elimination unit which is configured to eliminate noise from the surface shape data,
wherein the noise elimination unit is configured to perform coordinate conversion so that the pieces of surface shape data measured by a sensor in respective positional relationships are converted into pieces of surface shape data measured in the same positional relationship, in accordance with changes in a relative positional relationship between the part and the sensor measuring the shape of the surface of the part.

3. The wear inspection apparatus according to claim 2, wherein the processing target extraction unit is configured to create a histogram according to each value included in the surface shape data and a frequency of appearance of the value, adjust a classification width of the histogram on the basis of a predetermined number of groups in a case where values corresponding to a surface portion or a worn portion which are selected from among the values included in the surface shape data are classified into the number of groups, create a histogram in which the pieces of surface shape data are classified into the number of groups, and extract a portion of surface shape data corresponding to the flat portion and a portion of surface shape data corresponding to the worn portion formed in the surface of the part from the created histogram.

4. The wear inspection apparatus according to claim 2, wherein the processing target extraction unit is configured to extract the largest flat portion as a processing target section from the flat portion distinguished with the gradient portion as a boundary, out of the flat portion and the gradient portion after the distinguishment.

5. The wear inspection apparatus according to claim 1,
wherein the processing target extraction unit is configured to create a histogram according to each value included in the surface shape data and a frequency of appearance of the value, adjust a classification width of the histogram on the basis of a predetermined number of groups in a case where values corresponding to a surface portion or a worn portion which are selected from among the values included in the surface shape data are classified into the number of groups, create a histogram in which the pieces of surface shape data are classified into the number of groups, and extract a portion of surface shape data corresponding to the flat portion and a portion of surface shape data corresponding to the worn portion formed in the surface of the part from the created histogram.

6. The wear inspection apparatus according to claim 5,
wherein the approximation processing unit is configured to calculate the degree of wear of the part on the basis of a difference between the surface shape data corresponding to the worn portion which is extracted by the processing target extraction unit and the calculated approximation line.

7. The wear inspection apparatus according to claim 1,
wherein the processing target extraction unit is configured to extract the largest flat portion as a processing target section from the flat portion distinguished with the gradient portion as a boundary, out of the flat portion and the gradient portion after the distinguishment.

8. The wear inspection apparatus according to claim 7,
wherein the approximation processing unit is configured to calculate an approximation straight line on the basis of surface shape data corresponding to the flat portion extracted by the processing target extraction unit, and calculate an amount of wear of the part by integrating a difference between a value of the approximation straight line and a value of the surface shape data with respect to a section in which wear occurs in the surface shape data, the approximation straight line being approximate to a sequence of points of an unworn portion of the part in the surface shape data.

9. A wear inspection method comprising:
acquiring surface shape data including information indicating a shape of a surface of a part worn as a vehicle travels;
distinguishing between a gradient portion in which a difference between a value of each point included in the surface shape data and a value of an adjacent point is larger than a predetermined threshold value, and a flat portion in which the difference is smaller than the predetermined threshold value in the surface shape data, and extracting a processing target section for calculating a degree of wear in the surface shape data from the gradient portion and the flat portion after the distinguishment;
calculating an approximation line of a worn portion included in the acquired surface shape data and an approximation line of an unworn portion included in the surface shape data, and calculate a degree of wear of the part from a difference between the approximation line of the worn portion and the approximation line of the unworn portion;
evaluating the degree of wear of the part according to operation conditions of the vehicle on the basis of the degree of wear of the part and operation data indicating the operation conditions of the vehicle including the part; and
acquiring operation data on a target vehicle serving as an evaluation target, evaluating a degree of wear occurring in a part of the target vehicle on the basis of the operation data and the degree of wear of the part, and predicting a time for replacement of the part of the target vehicle for which the degree of wear is evaluated, on the basis of information indicating the time for replacement of the part which is determined in association with the degree of wear of the part of the target vehicle.

* * * * *